United States Patent [19]
Shimada et al.

[11] 3,926,682

[45] Dec. 16, 1975

[54] METHOD FOR PRODUCING SOLID MATERIAL HAVING AMORPHOUS STATE THEREIN

[75] Inventors: Toshikazu Shimada, Tokyo; Kiichi Komatsubara, Tokorozawa; Susumu Hasegawa, Aomori; Yoshiki Kato, Tokyo, all of Japan

[73] Assignee: Hitachi, Ltd., Japan

[22] Filed: Oct. 15, 1974

[21] Appl. No.: 514,926

[30] Foreign Application Priority Data

Oct. 17, 1973 Japan .............................. 48-115811
May 22, 1974 Japan .............................. 49-56570

[52] U.S. Cl. ........................ 148/1.5; 148/4; 117/17; 357/91
[51] Int. Cl.² ........................................ H01L 21/263
[58] Field of Search ........... 148/1.5, 4; 117/17, 201; 357/91

[56] References Cited

UNITED STATES PATENTS 3,736,192 5/1973 Tokuyama .......................... 148/1.5

OTHER PUBLICATIONS

Davey et al. "Structural and Optical Evaluation of Vacuum-Deposited GaP Films," J. Appl. Phys. Vol. 40, No. 1, Jan. 1969, pp. 212–219.

*Primary Examiner*—L. Dewayne Rutledge
*Assistant Examiner*—J. M. Davis
*Attorney, Agent, or Firm*—Craig & Antonelli

[57] ABSTRACT

A uniformly and perfectly amorphous GaP is obtained by irradiating a GaP body with $N^+$ ions of 200 KeV, at a current density of 1 $\mu A/cm^2$, by an amount of $5 \times 10^{15}/cm^2$, thereby forming a disordered state of GaP in the body to a depth of about 0.5 $\mu m$ from its surface, and heating said GaP body at 430°C which is higher than a transition temperature of GaP from the disordered state to the amorphous state and lower than a crystallization temperature of GaP, for 10 minutes within an argon gas.

10 Claims, 25 Drawing Figures

METHOD FOR PRODUCING SOLID MATERIAL HAVING AMORPHOUS STATE THEREIN

This invention relates to a method for generating an amorphous layer near a surface of a material having different properties from those of the material.

An object of the present invention is to provide a method for producing a solid material having a uniformly and perfectly amorphous state therein.

Another object of the present invention is to provide a method for producing a solid material having an amorphous state therein, which is superior in mechanical, chemical, electrical and optical properties.

The objects mentioned above are accomplished by irradiating a starting material with at least one beam selected from among ionic, atomic and molecular beams in excess of an amount to saturate lattice defects in said starting material so as to render said starting material at least partially into a disordered state, and heating said starting material at higher temperature than a transition temperature of said starting material to an amorphous state.

Other objects, features and advantages of the present invention will be apparent from the following detailed description of some preferred embodiments thereof taken in conjunction with the accompanying drawings wherein.

Figure 5:
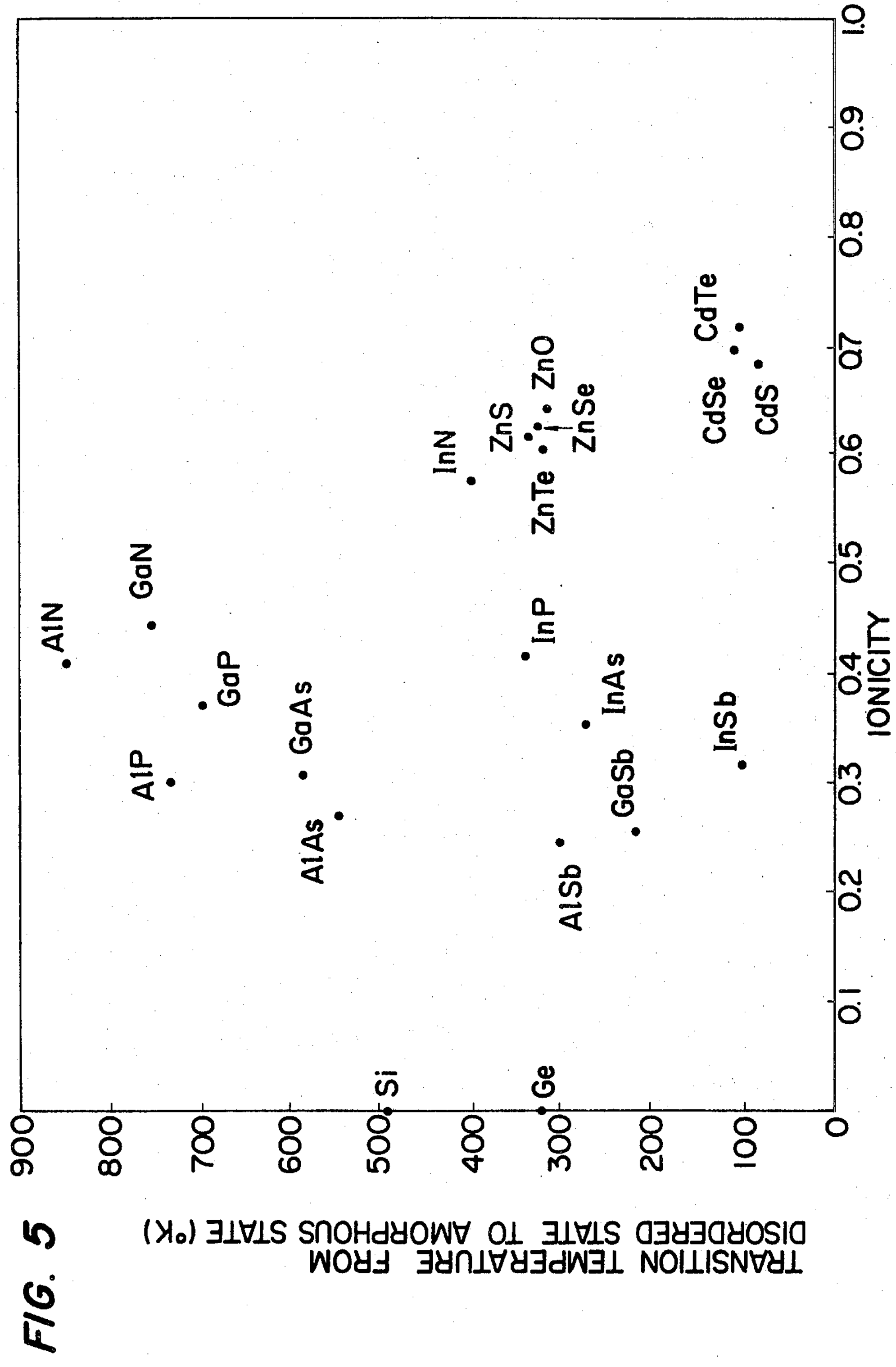
Figure 6:
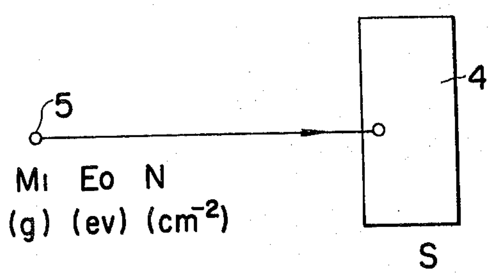
Figure 7:
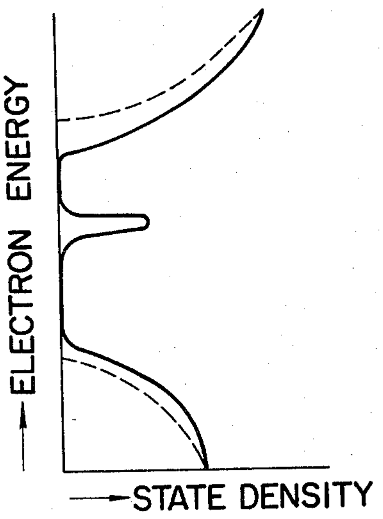
Figure 8:
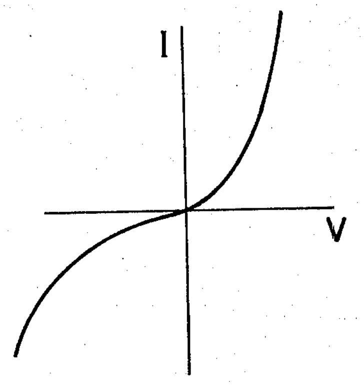
Figure 9:
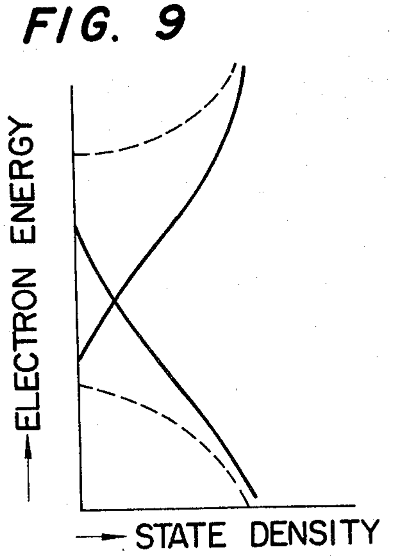
Figure 10:
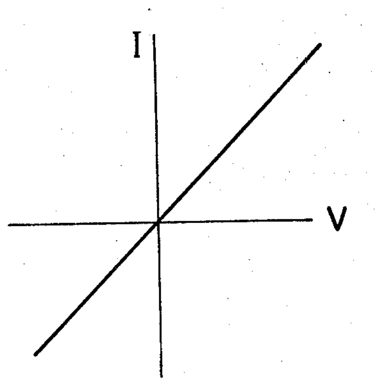
Figure 11:
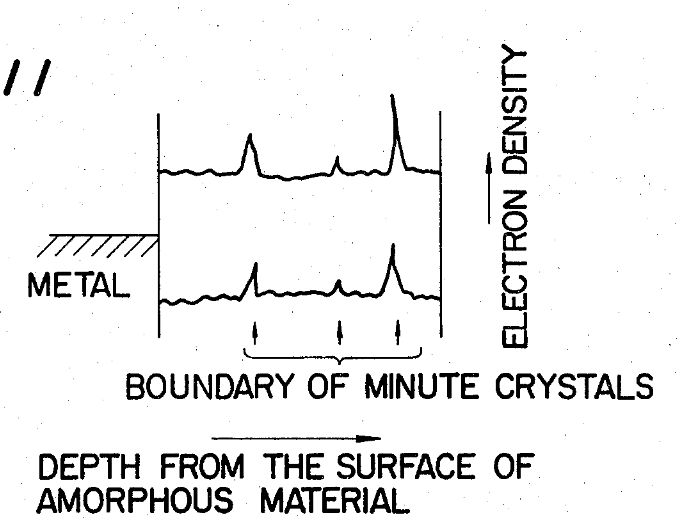
Figure 12:
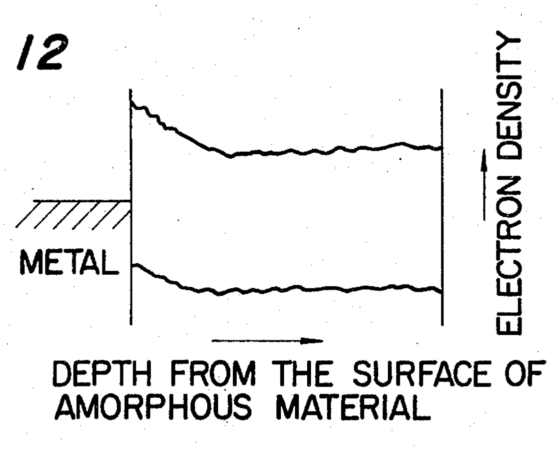
Figure 14:
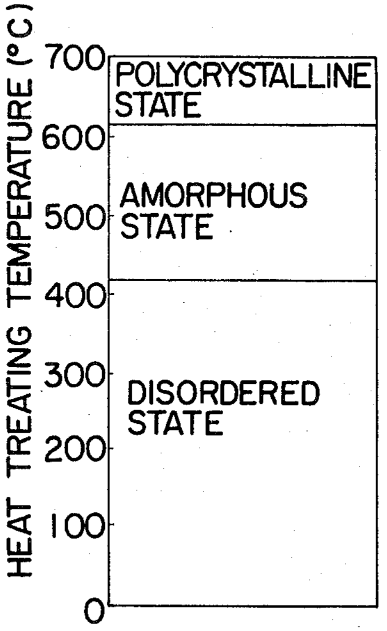
Figure 15:
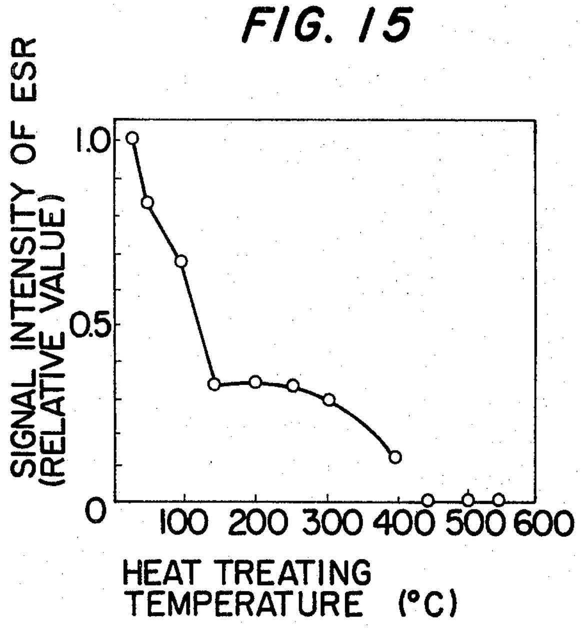
Figure 16:
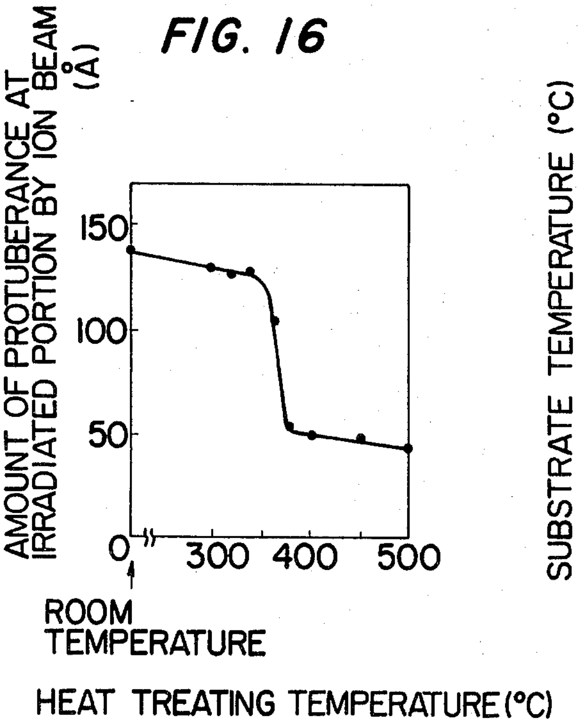
Figure 21:
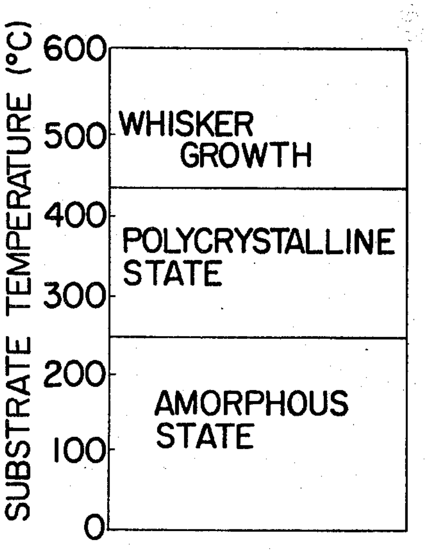
Figure 17:
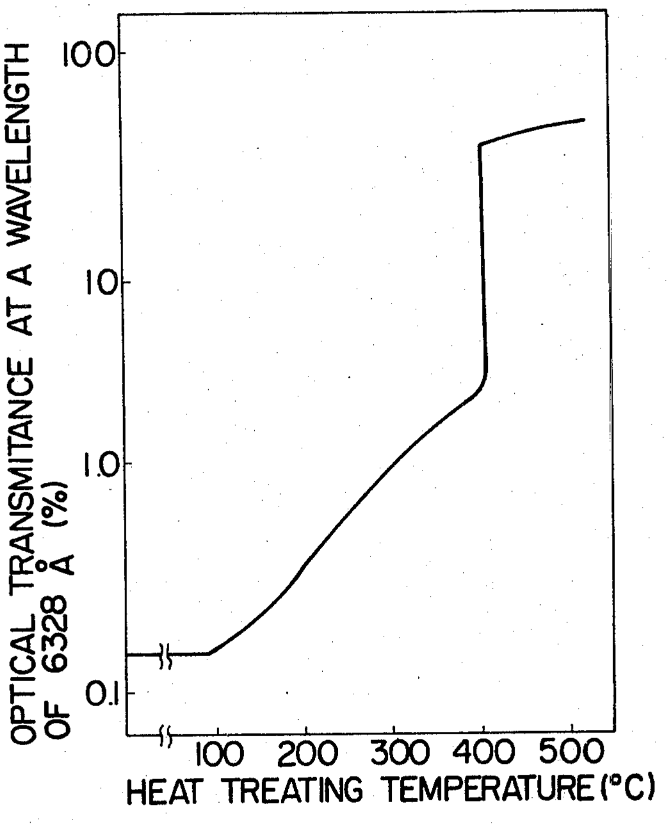
Figure 18:
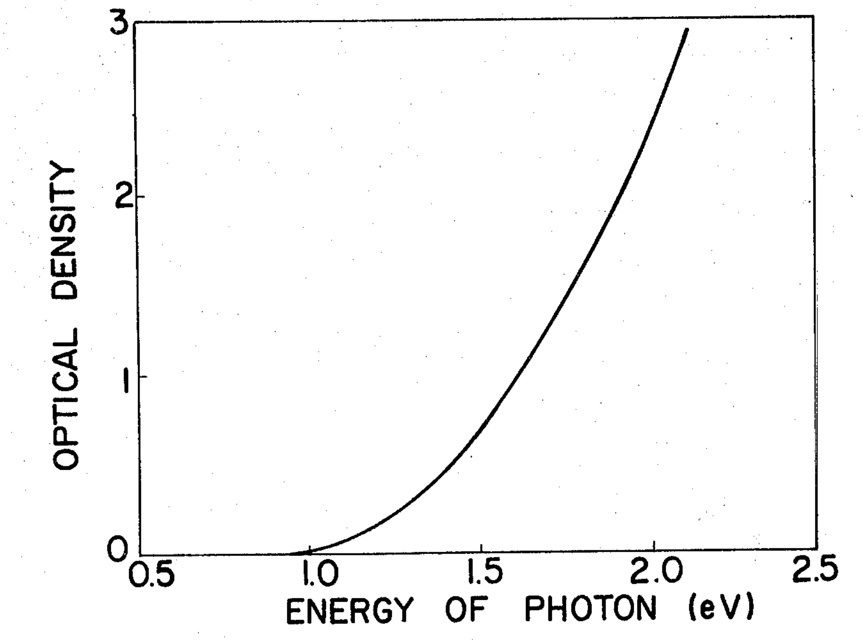
Figure 19:
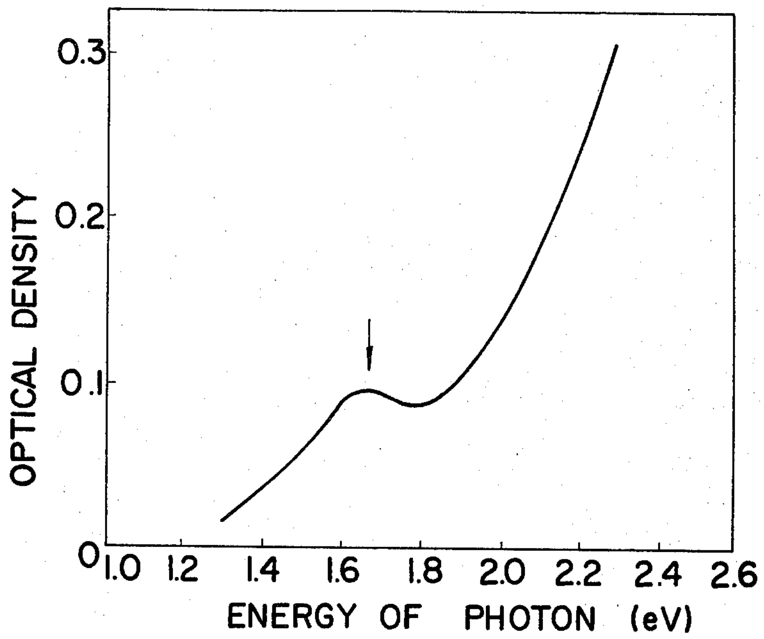
Figure 20:
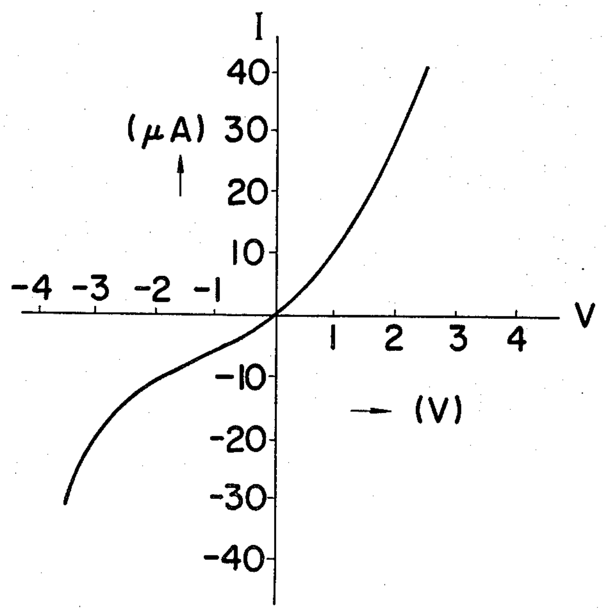

FIGS. *4a* and *4b* are explanatory views for the feature of the conventional heat treatment and for the feature of the heat treatment of the present invention, respectively;

FIG. 5 shows the transition temperature from the disordered state to the amorphous state in accordance with the present invention;

FIG. 6 shows the feature of the inventive ion implantation process of the present invention;

FIG. 7 is an electron energy structure for the amorphous state;

FIG. 8 is a diagram showing voltage-current characteristics of an amorphous state material on which metallic electrodes are affixed;

FIG. 9 is an electron band structure for the disordered state;

FIG. 10 is a diagram showing the voltage-current characteristic of the disordered state material on which metallic electrodes are affixed;

FIG. 11 is an energy band structure for the amorphous material produced by the conventional vacuum evaporation process;

FIG. 12 is an energy band structure for the amorphous material obtained by the inventive method;

FIGS. 13*a* through 13*d* are views showing an embodiment for producing an amorphous GaP diode;

FIG. 14 is a view showing the changes in the atomic arrangement of ion implanted GaP with varying heat treating temperatures;

FIG. 15 is a diagram showing the changes in the ESR signal intensity with treating temperatures of the ion implanted GaP according to the embodiment of FIG. 13;

FIG. 16 is a view showing the changes in volume with varying heat treating temperatures of the ion implanted GaP according to the embodiment of FIG. 13;

FIG. 17 is a diagram showing the changes in the light transmitance with varying heat treating temperatures of the ion implanted GaP according to the embodiment of FIG. 13;

FIG. 18 is an optical absorption spectrum of the ion implanted GaP according to the embodiment of FIG. 13;

FIG. 19 is an optical absorption spectrum of the ion implanted GaP according to the embodiment of FIG. 13 following heat treatment;

FIG. 20 is a diagram showing the voltage-current characteristic of the amorphous GaP sample affixed with electrodes according to the embodiment of FIG. 13; and FIG. 21 is a view showing the changes in the atomic arrangement of the conventional vacuum deposited of GaP film.

Before making the detailed description of the invention, the meaning of the terms used in the present specification will be clarified hereinbelow mainly to illustrate the difference among the crystal, amorphous and disordered states.

The crystal state will be explained first of all.

Figure 1:
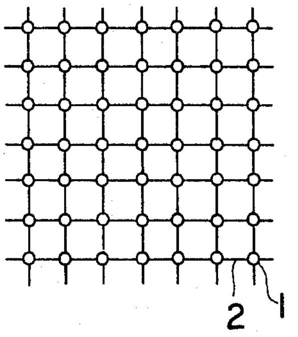
FIG. 1 is a schematic view showing the atomic arrangement of the crystal.

The component atoms of the crystal are arranged regularly with fixed periodicity as shown schematically in FIG. 1. In the typical example shown in FIG. 1, a crystal lattice is formed by single atoms arranged in a cubic structure. Each atom 1 has four bonds 2 and is disposed with a constant lattice interval. In this example, the interatomic distance and the bond angle are also constant. The crystal state is endowed not only with such short-range but with long-range order because of the completely periodic arrangement of the component atoms.

Figure 2:
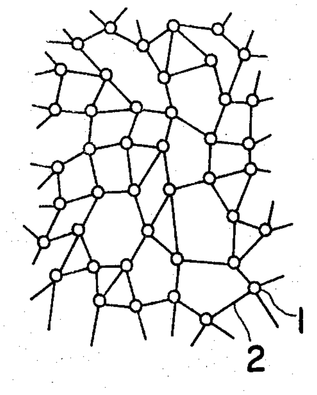
FIG. 2 is a schematic view showing the atomic arrangement for the amorphous state.

In the perfectly amorphous material as shown in FIG. 2, the neighboring atoms are bonded to one another under substantially the same condition as the crystal material explained above. In the instance shown in FIG. 2, a single atom is connected by its four bonds with four neighboring atoms and the interatomic distance is about the same as that of the crystal material. The bond angle does not differ substantially. In FIG. 2, the bond length and angle appear to be nonuniform because the cubic state is shown intentionally in a planar configuration. However, in the amorphous material shown in FIG. 2, at a distance equal to several atoms for a given atom, the relative position of the atoms is highly disturbed and the periodicity of crystal may no longer be observed to exist. To summarize, the amorphous state has a short-range order in the disposition of atoms, but a long-range order is lost.

In the disordered state, the short-range order proper to the amorphous state as shown in FIG. 2 is lost, to say nothing of the long-range order as explained with reference to FIG. 3. Four bonds of a single crystal are not connected with four neighboring atoms, and a number of dangling bonds 3 will be observed to exist, and even vacancy cluster may be generated in an extreme case. In the disordered state, the density and stability of the material are lower than in the crystal and amorphous states, and the mechanical as well as chemical, electrical and optical properties of the material will be changed markedly.

Next, the three states of the material, viz. crystal, amorphous and disordered states will be contrasted as to their mechanical, chemical, electrical and optical properties.

Figure 3:
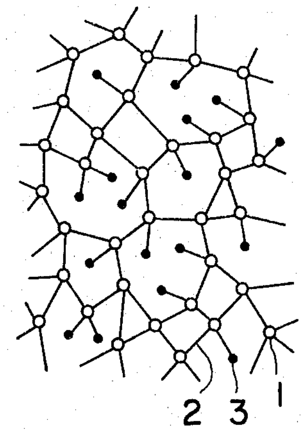
FIG. 3 is a schematic view showing the atomic arrangement for the disordered state.

With the crystal and disordered states, unstable bonds exist inevitably on the surface of the material (FIGS. 1 and 3). In contrast with these states, the amorphous state is characterized by mechanical wear-resistance and chemical stability due to the reduced tendency towards chemisorption. When the crystal state is compared to the amorphous or disordered state, it will be observed that dislocation may be formed in the former state but it can not appear in the latter essentially, meaning that the latter state gives a harder material. In the electrical aspect, the disordered state is accompanied with many dangling bonds and hence many carriers, which will reduce the electrical resistance of the material. Moreover, a deep trap may be caused frequently on account of these dangling bonds and therefore a semiconductor element produced from the material in the disordered state is not suited to high-speed performance. In the optical aspect, the regularity between the closely adjacent atoms, namely, short range order is lost in the disordered state, so the local symmetry is also lost and such changes may be noted that the great variation is caused in the selection rule for the optical transition.

The crystal, amorphous and disordered states of the material have been defined in the above. Heretofore, the state of a sample obtained by evaporation was often confused or expressed inaccurately, although a theoretical distinction was made among these states. Confusion was often made especially between the amorphous and disordered states, due partly to the absence of a process for producing a completely amorphous state or material.

Next, the comparable prior art will be explained below to clarify that the above-mentioned confusion was caused actually and that the completely amorphous material that could not be produced by the prior art can be actually obtained by relying upon the inventive method.

The method of producing amorphous germanium (as it was so called) by relying upon vacuum evaporation method will be described as an example. It will become apparent from the following description that the term "amorphous" should be correctly defined by the term "disordered" according to the foregoing definition.

With this prior-art method, germanium is deposited on a glass or molybdenum plate to a predetermined thickness and subjected to heat treatment for about two hours at about 400°C to give amorphous germanium, as it is so called. With vacuum evaporation technique, the material to be deposited is heated to a high temperature by a heater so as to be evaporated and deposited on the substrate. Thus, it is not the single atoms, but a cluster of a certain number of atoms, that are deposited on the substrate. Hence, minute crystals may be formed locally. When subjected to subsequent heat treatment, the material may be readily crystalized about the nuclei provided by these minute crystals to form a polycrystal.

It is therefore extremely difficult to select and properly control the temperature and duration of heat treatment.

Moreover, a uniform and stable material can not be obtained by this method, since the amorphous material obtained by such method is accompanied unevitably with dangling bonds and occasionally with vacancy clusters. The amorphous germanium obtained by this method has lower chemical stability and density lower by about 15 percent than those of the crystal phase possibly as a result of the above circumstances. According to the above definition, the amorphous germanium obtained as conventionally by the vacuum evaporation method is not completely amorphous but incompletely or nonuniformly amorphous or disordered states.

Deposition of a GaP film will be explained below for illustrating a typical process for producing an amorphous semiconductor as it was so called in the conventional technique. The arrangement of the atoms and the optical properties of the GaP film obtained by vacuum evaporation method are explained in detail in "Structural and Optical Evaluation of Vacuum-Deposited GaP Films" in Pages 212 – 219, No. 1, Vol. 40, *Journal of Applied Physics*, hereafter referred to as Literature 1. The gist of this technique will be explained briefly below.

In producing the GaP film, GaP is deposited on a glass quartz plate by vacuum evaporation and subjected to proper heat treatment. FIG. 1 of the Literature 1 shows the atomic arrangement of the generated film for varying the substrate temperature at the time of vacuum deposition (FIG. 21). Electron diffraction and X-ray diffraction have been used for estimating the atomic arrangement of the deposited film. According to the Literature 1, the GaP film deposited at the substrate temperature below 240°C is estimated to be amorphous. It is, however, obvious that many dangling bonds exist in the GaP film alleged to be amorphous, because the deposited film is opaque and metallic appearing, as stated in said Literature 1. According to the above definition of the amorphous state, the GaP film alleged to be amorphous is obviously in the disordered state which has been confused frequently with the amorphous state. The reason for this will become apparent from the Example 1.

The Literature 1 states that the GaP film deposited at the substrate temperature of 240° to 425°C is in a polycrystalline state, and that the growth of needle crystals may be observed to occur above the substrate temperature of 425°C. Obviously, these films are not amorphous.

It will be apparent from above that the completely amorphous material different from the allegedly amorphous material inclusive of the disordered state material can not be obtained by relying upon the process stated in the Literature 1.

This invention has been made to obviate such a defect inherent in the above prior-art method. According to this inventive method, the material is irradiated with ion or other beams to produce many lattice defects and then subjected to heat treatment so as to realize the amorphous state. The high-quality amorphous material obtained by the inventive method to be hereafter described is highly stable and uniform and free from minute crystals, vacancy cluster or dangling bonds. It has a density only smaller by about 1 percent than that of the starting crystal material, and a superior chemical stability.

The inventive process is essentially characterized in that the material is irradiated with ion beams in excess of a certain quantity so as to convert it into the disordered state and then subjected to heat treatment above a transition temperature to the amorphous state and below a crystallizing temperature so as to realize the amorphous material.

Before explaining the inventive method in detail, the conditions essential to the amorphous state and the distinction between the amorphous and disordered states will be explained.

The conditions essential to the amorphous state may be defined by contrast with those essential to the crystal. The crystal has a certain periodicity in the arrangement of constituent atoms, and a long-range order, which is absent in the amorphous state. The order of the amorphous material, i.e. the interatomic distance and the mode of bond of the atoms that may be approximated to that of the crystal is limited to the atoms adjacent to one another or at most to the next nearest neighbor atoms. However, the amorphous state necessarily has a short-range order and is devoid of any broken bonds. The disordered state is characterized by the absence of the long-range order and the disturbed short-range order, in the sense that the bonds are interrupted at many points to produce so-called dangling bonds. The material in such state is not only unstable but suffers from considerable alternation in the mechanical, chemical, electrical and optical properties.

Next, the effectiveness of the present invention will be explained. According to this invention, the starting material is irradiated with ion beams in excess of a certain quantity to be converted once into the disordered state. This method was known per se, but was not prosecuted in such a way as to produce uniform and stable amorphous material, because of the above-mentioned indefinite distinction between the amorphous and disordered states. According to this invention, the amorphous material thus obtained is subjected, following the above irradiation step, to a heat treatment step at a temperature above the transition point to the amorphous state and lower than the crystallization temperature so as to realize only the short-range order. This range of temperature is especially important and should naturally be lower than the crystallization temperature and, in addition, should be higher than the temperature at which the transition to the amorphous state takes place, for the reason to be elucidated below.

Figure 4A:
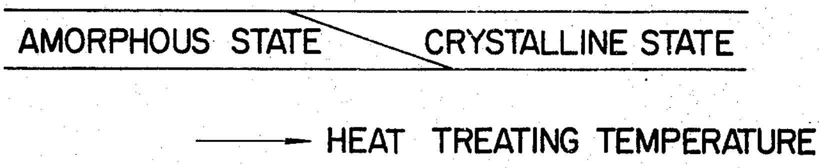

The conception of the conventional heat treatment and that of the inventive heat treatment are shown explanatorily in FIG. 4. It was concieved heretofore that the transition to the amorphous takes place by irradiating the material with ion or other beams in more than a certain amount. By this reason, the heat treatment was not included in the conventional method, since the heat treatment was believed to promote crystallization to cause the transition from the amorphous to the crystal state, as shown in FIG. 4. The reason for this may be such that, as shown in FIG. 1 of the Literature 1, the deposited film obtained at the substrate temperature of 240° to 425°C will form a polycrystal. In the vacuum evaporation method, the atoms of the material are not deposited as separate atoms, but in a cluster of certain number of atoms, thus forming minute crystals. The deposited material may then be crystallized about the nuclei provided by these minute crystals. Thus, the deposited film will be crystallized above the substrate temperature of 240°C.

Figure 4B:
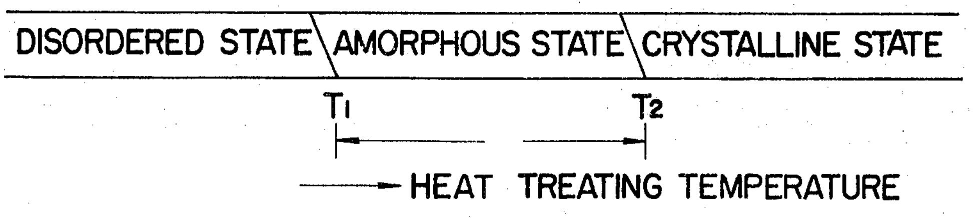

As a result of a prolonged experiment, the present inventors have discovered that the irradiation of the material with more than a certain quantity of ion or other beams will not lead to transition to the amorphous state, but rather to the disordered state, that the disordered state thus realized may be converted into the amorphous state by the subsequent heat treatment, as shown schematically in FIG. 4*b*, and that the conversion into the amorphous state may be accomplished by the heat treatment at a temperature higher than a certain lower limit temperature.

FIG. 5 shows the transition temperatures for several materials at which the materials converted into the disordered state by irradiation with more than a fixed quantity of the ion or other beams are converted finally into the amorphous state by the heat treatment. In FIG. 5, the ratio of the Coulomb force to the covalent force between the atoms of the material, or the ionicity, is plotted on the ordinate. The ionicity is zero for germanium and silicon whose bond is completely covalent and increases progressively for the compounds of III and V group elements and the compounds of II and VI group elements, in this order. The temperatures for heat treatment required for transition from disordered amorphous states are plotted on the abscissa. The transition temperatures from the disordered to the amorphous states for some materials are 490°K for Si; 315°K for Ge; 840°K for AlN; 720°K for AlP; 540°K for AlAs; 300°K for AlSb; 750°K for GaN; 690°K for GaP; 580°K for GaAs; 210°K for GaSb; 400°K for InN; 330°K for InP; 270°K for InAs; 105°K for InSb; 310°K for ZnO; 330°K for ZnS; 325°K for ZnSe; 315°K for ZnTe; 800°K for CdS; 105°K for CdSe; and 100°K for CdTe. The transition temperature for a mixture or an alloy of the above-mentioned single atom or compound semiconductors may be calculated as a weighted mean value of the respective transition temperatures with each temperature being multiplied by its mixture or alloy ratio as weight ratio.

The first feature of this invention resides in converting the material into the disordered state.

Should the material retain some crystallinity, if any; it is still liable to crystallize about the remnant crystals. Hence, it will be difficult to convert the material ultimately into the amorphous state. Therefore, in order to effect the transition into the disordered state, the ion or other beams must be irradiated in excess of a certain critical value. The manner in which to determine this critical value will be explained below.

FIG. 6 shows schematically and particularly the process in which transition to the disordered state may be realized by irradiating the material with ion or other beams. In FIG. 6, it is now assumed that a material 4 is irradiated by N ion or other particles 5, with each particle 5 having a mass $M_1$ and an energy $E_0$. These particles 5 will collide repeatedly with the constituent atoms of the material 4 until their energy is lost completely and the particles 5 are brought to a stop. The energy possessed by the particles 5 is lost in either of the following two ways, viz. the energy is converted into the lattice vibration energy of the constituent atoms of the material 4 and lost, or used for exciting the electrons of the constituent atoms. The latter energy is dissipated in the form of the lattice vibration energy, but it is not substantially so effective as to pull out the constituent atoms from the lattice sites of the material. Hence, the former energy is responsible after all to effect the transition of the material to the disordered state. Thus, the kinetic energy of the incident atoms $E_O$ is expressed by the formula $$E_O = E_n + E_e$$

where $E_n$ is the energy turned into the vibration energy of the lattice atoms and $E_e$ that used for exciting the electrons. The incident atoms collide in this way with the constituent atoms of the material again and again to effect the transition of the material into the disordered state until they attain a certain depth and are stopped there with loss of energy. The value of $E_n$ is determined as a function of $M_1$, $E_0$, the kinds of the constituent atoms and the lattice structure of the material. The mean value for the depth attained by the incident atoms varies with $M_1$, $E_0$, the kinds of the constituent atoms and the lattice structure, but an experimentally correct value may be calculated in a known manner per se. The mean depth R attained by the incident particles corresponds roughly with the depth of conversion into the amorphous state accomplished by the irradiation. If assumed that the mean energy required to pull out a single constituent from the lattice site of the material 4 is $E_d$, the number of the constituent atoms pulled out by irradiation of a single particle 5 is given as $E_n/E_d$, which is about equal to 1000 under practical conditions. Thus, the effect of a single irradiating particle itself can be negligible. With N $cm^{-2}$ the number of irradiating particles, the density $n_c$ of pulled out atoms in the region of transition to the disordered state is given by $$n_c = \frac{NE_n}{RE_d} cm^{-3}.$$

Should $n_c$ exceed the atom density $m_s$ of the material, all the constituent atoms have been pulled out at least once from the lattice site, meaning that the material is rendered into the disordered state. In order that the entire region of the material may be converted completely into the disordered state, it is necessary to irradiated the material until $n_c \leq 10\ n_s$.

Concrete examples of amounts of ion beams are shown in the following table.

| Substrate | Ion | Ion energy (KeV) | Amount of Ions($cm^{-2}$) |
|---|---|---|---|
| Si | Sb | 40 | $1 \times 10^{14}$ |
| | Sb | 200 | $6 \times 10^{13}$ |
| | Ne | 40 | $3 \times 10^{14}$ |
| | Ne | 200 | $6 \times 10^{14}$ |
| Ge | Ne | 40 | $1.5 \times 10^{14}$ |
| | Ne | 200 | $3 \times 10^{14}$ |
| | B | 40 | $5 \times 10^{14}$ |
| | B | 200 | $1.5 \times 10^{15}$ |
| GaP | N | 100 | $5 \times 10^{14}$ |
| | N | 200 | $8 \times 10^{14}$ |
| | Zn | 150 | $6 \times 10^{13}$ |
| GaAs | Ar | 100 | $8 \times 10^{13}$ |
| | Ar | 200 | $1 \times 10^{14}$ |
| | Zn | 150 | $5 \times 10^{13}$ |

Though above explanations are for ion beams, in the present invention, atomic and molecular beams are utilized instead of the ion beam, and amount of atomic and molecular beams are determined as follows:

When the atomic beam is utilized, the amount thereof is the same as that of the ion beam whose ion has the same mass and the same energy as those of the atom constructing the atomic beam; and when the molecular beam is utilized, the amount thereof is the same as that of the ion beam whose ion has the same mass and energy as those of the molecules constructing the molecular beam.

This value corresponds to the case of irradiating at 0°K, and the thermal effect caused by implantation is left out of consideration. In case of the practical irradiation at room temperature the material may be said to be thermally treated at about 300°K as it is irradiated with the ion or other beams, and hence the progress of transition to the disordered state is retarded. Thus, a surplus irradiation will be necessary in relation with the speed of irradiation. As a matter of fact, the effect of thermal treatment may be left out of consideration by using a temperature during irradiation lower than and practically less than one half of that shown in FIG. 5.

While the meaning of temperature $T_1$ is described in the above, the value of the temperature $T_2$ is varied with the stability of the amorphous state. The transition to the amorphous state may not occur when the difference between $T_1$ and $T_2$ is small and when $T_1 > T_2$ in an extreme case. The temperature $T_2$ depends obviously upon the manner of combination of the constituent atoms. The lower the bonding energy and the larger the Coulomb's force or the long-range force of a crystal, the easier it is to convert it into the amorphous state. It may be said that the material with a larger ionicity as shown in FIG. 5 may be converted more easily into the amorphous state. However, the material with a lower ionicity can be converted more easily into the disordered state. In the end, it is the material with an ionicity as shown in FIG. 5 close to 0.5 and a higher transition temperature to the amorphous state that can be converted most easily into the amorphous state.

The temperature $T_2$ should naturally be lower than the decomposition, sublimation and melting points of the starting material.

Concrete examples of the temperature $T_2$ are shown in following table.

| Sub-strate | $T_2$ (°K) | Sub-strate | $T_2$ (°K) | Sub-strate | $T_2$ (°K) |
|---|---|---|---|---|---|
| Si | 695 | GaP | 980 | ZnO | 440 |
| Ge | 445 | GaAs | 825 | ZnS | 470 |
| AlN | 1190 | GaSb | 300 | ZnSe | 460 |
| AlP | 1020 | InN | 570 | ZnTe | 445 |
| AlAs | 765 | InP | 470 | CdS | 115 |
| AlSb | 425 | InAs | 385 | CdSe | 150 |
| GaN | 1065 | InSb | 150 | CdTe | 140 |

This invention is characterized in that the substrate material is converted once in the perfectly disordered state and then subjected to a heat treatment at a temperature between the transition temperature $T_1$ and the crystallizing temperature $T_2$ so as to provide a high-quality amorphous layer or film.

Thus, the temperature for heat treatment according to this invention is comprised between $T_1$ and $T_2$ as shown in FIG. 4(*b*).

The high-quality amorphous material obtained in this way has a zone of concentrated state density near the center of the optical gap, as shown in FIGS. 7 and 9, where the solid line denotes the change in the state density and the dotted line the band structure of the crystal. Thus a Schottky barrier may be obtained by vacuum depositing of gold, aluminum or other metals to provide a nonlinear voltage-current characteristics as shown in FIG. 8. Thus, the irradiation of light leads to the generation of an electromotive force or the change in the electrical conductivity. Such properties can be used advantageously in photodetectors or solar cells. The material which has undergone the transition to the disordered state due to ion implantation can be used as ohmic contacts, as will be understood from the electron energy diagram of FIG. 9 and the voltage-current characteristic diagram of FIG. 10.

The uniform and perfectly amorphous semiconductor material obtained in this way has a packing density of the constituent atoms approximate to that of the crystal phase and very hard as compared to the nonuniform and imperfectly amorphous material obtained as conventionally by the vacuum evaporation or other process. Moreover, such material is insusceptible to the formation of minute crystals even in the case of the temperature increase due to the Joule's heat and other causes, and thus can be used reliably as highly durable memory or negative resistance elements and the like, which is a great advantage over the conventional imperfectly amorphous material obtained by the conventional technique.

Moreover, the photosensitivity of the high-quality amorphous material used in a photocell is superior to that of the amorphous material produced as conventionally by vacuum evaporation or sputtering. The latter material is imperfectly amorphous and has a partly crystalline structure so that notches may be caused as shown in the energy diagram of FIG. 11 and act to inhibit the transfer of the carriers produced by excitation with light or to lower the electromotive force. On the contrary, the amorphous material obtained by the inventive method is uniform and free from formation of the minute crystals and the resulting notches in the energy diagram (see FIG. 12) and has the optimum characteristics with respect to the photo-conductivity and the level of the induced electromotive force.

The amorphous material obtained in this way may be used advantageously for manufacture of photocells, photosensors, memory elements, negative resistance elements and the like.

The features and effects of this invention will become more apparent from the following examples.

EXAMPLE 1

Formation of a uniform and perfectly amorphous GaP layer near the surface of a GaP single crystal An n-type GaP single crystal was used as a substrate 6 in FIG. 13. The n-type singlecrystal sample 6 can be replaced naturally by a p-type one. The P face [$(\bar{1}\,\bar{1}\,\bar{1})$ face] of this crystal was polished on a glass plate by using alumina powders and mirro-finished on a grinding cloth by using a diamond paste about 0.5 $\mu$m in diameter.

Figure 13A:
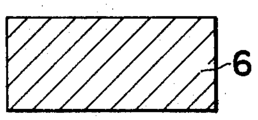
Figure 13C:
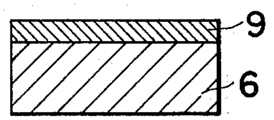
Figure 13B:
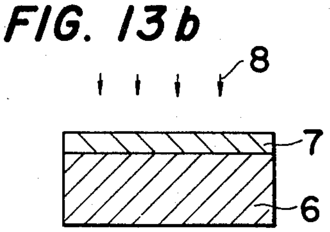
Figure 13D:
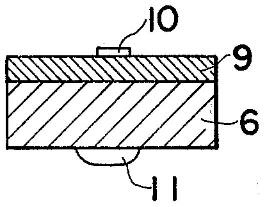

The substrate was etched at 50°C for 5 minutes by using an etching solution ($HF:HNO:H_2O = 4:1:5$) (see FIG. 13*a*). This sample was irradiated in a perpendicular direction with 200 KeV – $N^-$ ions 8 of $5 \times 10^{15}$ $cm^{-2}$ at a current density of 1 $\mu A \cdot cm^{-2}$ (see FIG. 13*b*). By this operation, the GaP single crystal lost its crystalline order completely and was rendered into a disordered state to a depth of about 0.5 $\mu$m from its surface, thus producing a disordered layer 7. The sample 6 was charged into an electric furnace maintained at 430°C and thermally treated for 10 minutes, while an argon gas was circulated through the furnace at a rate of 5 lit./min. The sample 6 was then cooled rapidly to room temperature, for converting the disordered layer into an amorphous layer 9 (see FIG. 13*c*).

The diagram of lattice structure similar to FIG. 1 of the Literature 1 and obtained by employing the electron diffraction method is shown in FIG. 14. The marked difference between FIG. 1 of the Literature 1 and FIG. 14 resides in that crystallization will not take place in the invention method up to about 600°C. Thus, the sample 6 may be endowed exclusively with short-range order by the heat treatment at about 430°C without undergoing the transition to the crystal state.

The changes in the state of the material as shown in FIG. 14 may be confirmed in the first place by the electron spin resonance (ESR). The ESR signals due to the dangling bonds are produced upon irradiation with ion or other beams and disappear suddenly with heat treatment in the neighborhood of 400°C (see FIG. 15) showing that the sample has undergone the change from the disordered to the amorphous states.

Secondly, the irradiated portion of the sample is bulged outwardly as a result of the increase in the volume and the corresponding decrease in the density. The bulged amount of the sample is decreased suddenly with heat treatment in the neighborhood of 400°C (see FIG. 16) also showing definitely that the sample has undergone the change from the disordered to the amorphous states.

Thirdly, the disordered and amorphous states represent markedly different transmittances of light. The transmittance of the sample to the light of 6328 A wavelength is less than 0.2 percent at the time prior to heat treatment and following the ion implantation and increases gradually with increase in heat treating temperature. The transmittance is increased at about 410°C by about 20 times and amounts to about 50 percent. The reflection loss at the sample-air interface is included naturally in the transmission rate and a majority of the remaining 50 percent is the reflection loss, meaning that the light absorption has been reduced almost to null above this transition temperature.

Next, the changes in the optical absorption spectrum will be inspected in more detail. Before the treatment the sample represents a mode of optical absorption which is lowered gradually towards the low energy side as shown in FIG. 18. After the heat treatment, the absorption coefficient is decreased rapidly, as shown in FIG. 19, and a peak of absorption may be observed near 1.7 eV, in correct correspondence with the state density distribution shown in FIGS. 7 and 9. It is obvious from this that the amorphous material may be obtained in accordance with the inventive method.

As described above, the transition from the disordered to the amorphous states does not take place gradually with increase in the heat treating temperature but is accompanied with the phase change. To this end, the material must needs be in the disordered state. The sample material will be crystallized about the minute crystals as nuclei, if there be any, so the crystal state will be reached before the removal of the dangling bonds. Such defect inherent in the vacuum evaporation technique has been removed in the present invention.

For practical purposes, the heat treatment temperature should be higher than the room temperature in order to effect the transition from the disordered to the amorphous states, except in case the ion implantation is carried out at lower than the room temperature.

The higher the substrate temperature and the lower the current density of ion beams, the more the quantity of ions required to render the material into the disordered state. Should the recovery speed of crystalline order due to the heat treatment at the implantation temperature be higher than that of disappearance of crystalline order due to the ion beam irradiation, the transition to the disordered state will not take place. In this regard, the beam current density of 1 $\mu A/cm^2$ at the room temperature (about 25°C) as used in the present example may safely be said to be the condition of irradiation under which the transition to the disordered state may take place.

A gold film was vacuum deposited on the thus obtained amorphous material to a size of 500 $\mu m\phi$ and a thickness of about 5000 A to provide an electrode 10. Indium was applied to the substrate with use of a soldering iron to provide the other electrode 11 (see FIG. 13*d*). The voltage-current characteristics of the sample is shown in FIG. 20. The same characteristics represented a nearly straight line with a sample subjected merely to the ion implantation. In the former, the photo-electromotive force was generated, but that generated in the latter was only that caused under the electrode effect.

EXAMPLE 2

Conversion of the vacuum deposited GaP into the perfectly amorphous state

It was known heretofore to produce thin GaP films by the vacuum evaporation technique as disclosed in the Literature 1. Crystallization will take place at higher than 240°C, as indicated in FIG. 1 of the Literature 1. The same literature states that the formation of the amorphous state takes place at lower than 240°C, but it has become apparent that this state is that in which the amorphous state is mixed partly with the crystal state. When heat treated, this state is changed into the crystal (polycrystallization) and the perfectly amorphous state is not obtained. In accordance with the inventive method, a thin GaP film was vacuum deposited on the glassy quartz plate (about 5000 A) and irradiated with 300 KeV-neon ions of $3 \times 10^{15}$ cm$^{-2}$, at room temperature. The resulting product was heat treated for 20 minutes at 430°C to provide a uniform and perfectly amorphous GaP. The properties of the obtained film were the same as in Example 1 wherein a singlecrystal was used as substrate.

EXAMPLE 3

Conversion of CdS to the amorphous state

As apparent from FIG. 5, CdS is not turned into the disordered state, unless irradiated with ion or other beams at lower than 80°K. The obtained product is used exclusively at the lower temperature. An n-type CdS single crystal was kept at lower than 50°K and irradiated with 300 KeV-Cd ions of $1 \times 10^{15}$ cm$^{-2}$, thereby the surface of CdS being converted into the perfectly disordered state to the distance of about 1000 A. The obtained material is heat treated at 150°K for realizing the amorphous CdS as in the case of CdS. As the product will undergo crystallization at room temperature (about 300°K), it can be used effectively at a lower temperature than 250°K.

EXAMPLE 4

An n-type gallium arsenide (GaAs) wafer about ~10 × 10 × 0.3 mm$^3$ doped with tellurium (specific resistance: 0.3Ω.cm) was used as a sample. The sample surface adapted for ion implantation was mirror finished with carborundum powders and etched to a depth of more than 50 $\mu$m with a mixture of sulfuric acid, hydrogen peroxide and water with mixture ratio of 5:1:1. The surface thus treated was washed fully with pure water to be used as a crystal face for ion implantation. Ion implantation was carried out by using argon ions ($Ar^+$) under accelerating voltage of 200 KV at room temperature at a dose of $1 \times 10^{15}$cm$^{-2}$. The ion implanted layer had a specific resistance of ~2Ω.cm. This sample was charged into a furnace at 300°C in a nitrogen gas stream to carry out a heat treatment for 1 hour.

The specific resistance of the ion implanted layer thus obtained was increased to $10^8$ Ω.cm. The ion implanted layer was in the disordered state with many dangling bonds. Immediately after the ion implantation, the specific resistance was reduced by the mechanism of conduction involving the dangling bonds. The presence of these dangling bonds was confirmed through ESR.

When heat treated at 300°C, the dangling bonds will disappear from the ion implanted layer, which was also confirmed through ESR. This state was also confirmed by the electron beam diffraction method to be the amorphous state devoid of the dangling bonds. The sharp increase in the resistance of ion implanted GaAs single crystal followed by heat treatment is due probably to the disappearance of the dangling bonds from the implanted layer. The value of resistance was increased without regard to the conductivity type of the gallium arsenide single crystal used as the substrate or to the kinds of implanted ions.

The amorphous layer thus obtained was mechanically stable as compared with the GaAs single crystal and the etching speed was reduced to less than one half of that for the single crystal when the etching solution (sulfuric acid:hydrogen peroxide:water = 5:1:1) was used for etching the GaAs.

The amorphous layer obtained in this way is effective for surface treatment of GaAs devices.

It is to be noted that the invention is applicable not only to the above-mentioned materials, but all kinds of single-atom or compound semiconductor and single crystal, polycrystal and noncrystal materials including disordered and imperfectly or nonuniformly amorphous materials.

We claim:

1. A method for producing a solid material comprising the steps of:

irradiating a starting material with at least one beam selected from among ionic, atomic and molecular beams in excess of an amount to saturate lattice defects in said starting material at least partially into a disordered state; and heating said starting material at a temperature higher than a transition temperature to an amorphous state, but lower than a crystallizing temperature of said starting material.

2. A method for producing a solid material according to claim 1, wherein said starting material is irradiated with ionic beam.

3. A method for producing a solid material according to claim 1, wherein said starting material is Si, and said heating is held at a temperature between 490°K and 695°K.

4. A method for producing a solid material according to claim 1, wherein said starting material is Ge, and said heating is held at a temperature between 315°K and 445°K.

5. A method for producing a solid material according to claim 1, wherein said starting material is AlAs, and said heating is held at a temperature between 540°K and 765°K.

6. A method for producing a solid material according to claim 1, wherein said starting material is GaP, and said heating is held at a temperature between 690°K and 980°K.

7. A method for producing a solid material according to claim 1, wherein said starting material is GaAs, and said heating is held at a temperature between 580°K and 825°K.

8. A method for producing a solid material according to claim 1, wherein said starting material is InP, and said heating is held at a temperature between 330°K and 470°K.

9. A method for producing a solid material according to claim 1, wherein said starting material is CdS, and said heating is held at a temperature between 80°K and 115°K.

10. A method for producing a solid material according to claim 1, wherein said starting material is CdSe, and said heating is held at a temperature between 105°K and 150°K.

* * * * *